June 22, 1965 C. F. BACHLE ETAL 3,190,273
PISTON FOR INTERNAL COMBUSTION ENGINE
Filed Jan. 3, 1964 2 Sheets-Sheet 1

INVENTORS
CARL F. BACHLE
WALTER F. ISLEY
BY
Hanke & Hanke
ATTORNEYS

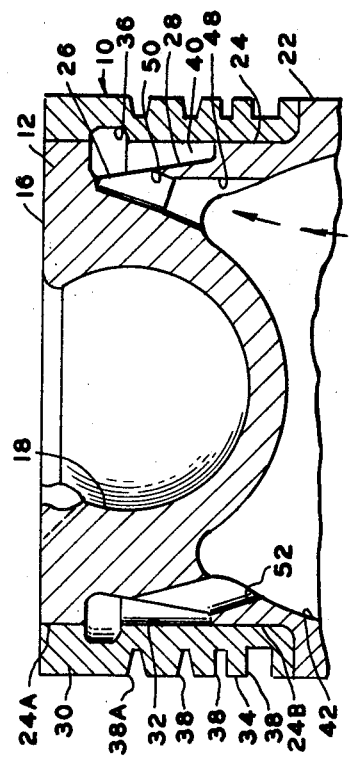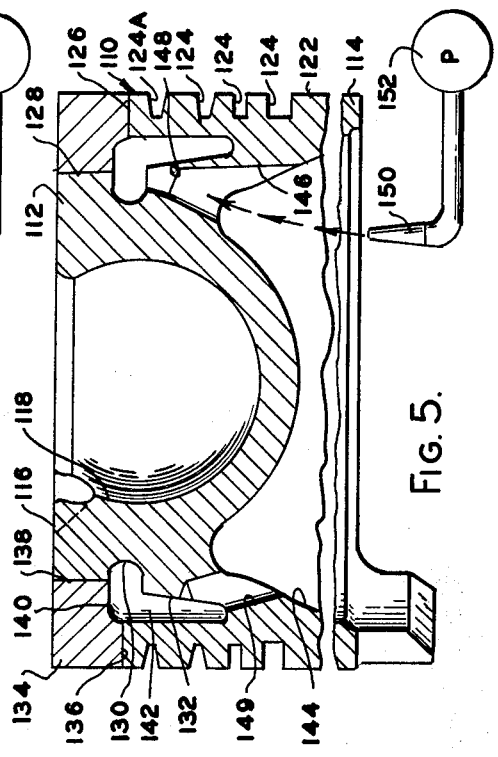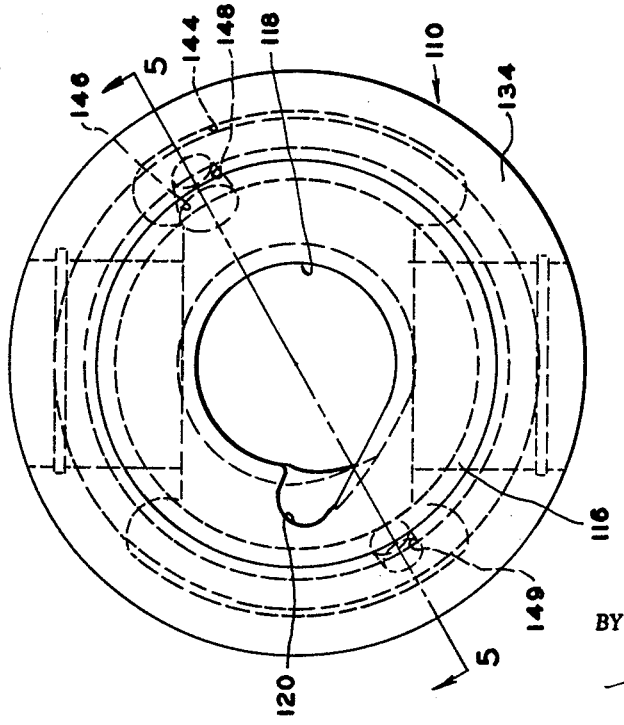

United States Patent Office 3,190,273
Patented June 22, 1965

3,190,273
PISTON FOR INTERNAL COMBUSTION ENGINE
Carl F. Bachle and Walter F. Isley, both of Grosse Pointe, Mich., assignors to Continental Aviation and Engineering Corporation, Detroit, Mich., a corporation of Virginia
Filed Jan. 3, 1964, Ser. No. 335,568
4 Claims. (Cl. 123—41.35)

The present invention relates to internal combustion engines and more particularly to a piston for such engines provided with means for cooling the vicinity of the piston rings carried by the piston.

The present invention is especially applicable to those internal combustion engines in which the combustion chamber is arranged entirely or substantially within the face of the piston although as the description proceeds it will be apparent that the construction of the present invention will be equally applicable to other types of pistons as well.

The advantages of providing the combustion chamber within the face of the piston have been known for some time. The most desirable shape for such a combustion chamber is in the form of a nearly hemispherical hollow space or cavity extending well into the head of the piston.

Because the combustion chamber extends below the ring groove area of the piston and is separated from this area by a relatively thin wall of material the intense heat produced in the combustion chamber is readily transmitted to the ring groove area. High temperatures in this area cause warping or distortion of the piston rings and if the temperatures are in excess of the coking temperature of the fuel being used to operate the engine deposits tend to form in the vicinity of the top ring groove interfering with the operation of the rings.

A copending application Serial No. 325,271, filed November 21, 1963, by Walter F. Isley, one of the co-inventors of the present invention, discloses a number of different piston constructions which provide a cavity disposed intermediate the combustion chamber and the ring groove area and means delivering a coolant to the cavity so that temperatures in this area are reduced during operation of the engine. The present invention provides improved methods of constructing such pistons.

It is an object then of the present invention to reduce fuel deposits in the vicinity of the top ring groove of pistons for internal combustion engines by providing means for cooling this area of the piston during operation of the engine.

It is another object of the present invention to increase the efficiency of internal combustion engines by providing cooling means in the area of the piston rings of such engines.

It is another object of the present invention to reduce the costs of manufacturing internal combustion engines by providing an improved, simply constructed piston for such engines.

Still further objects and advantages of the present invention will readily occur to one skilled in the art to which the invention pertains upon reference to the following drawings in which several preferred embodiments are illustrated with like reference characters referring to like parts throughout the several views and in which—

FIG. 3 is a fragmentary cross-sectional view taken substantially on line 3—3 of FIG. 1 with some structure illustrated schematically for purposes of clarity.

FIG. 4 is a top elevational view similar to FIG. 1 but illustrating another preferred piston of the present invention, and FIG. 5 is a fragmentary cross sectional view similar to FIG. 3 but taken substantially on line 5—5 of FIG. 4.

Description

Figure 1:
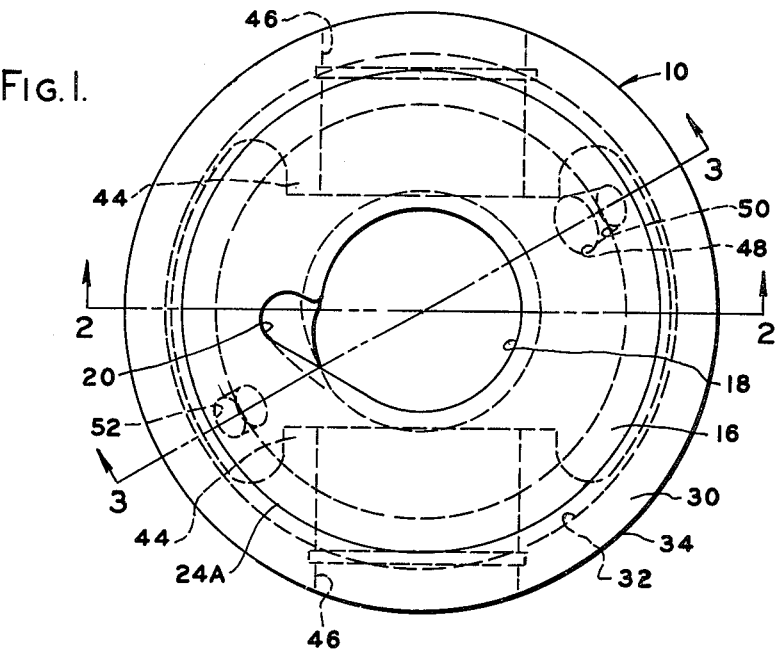
FIG. 1 is a top elevational view of one preferred piston of the present invention.
Figure 2:
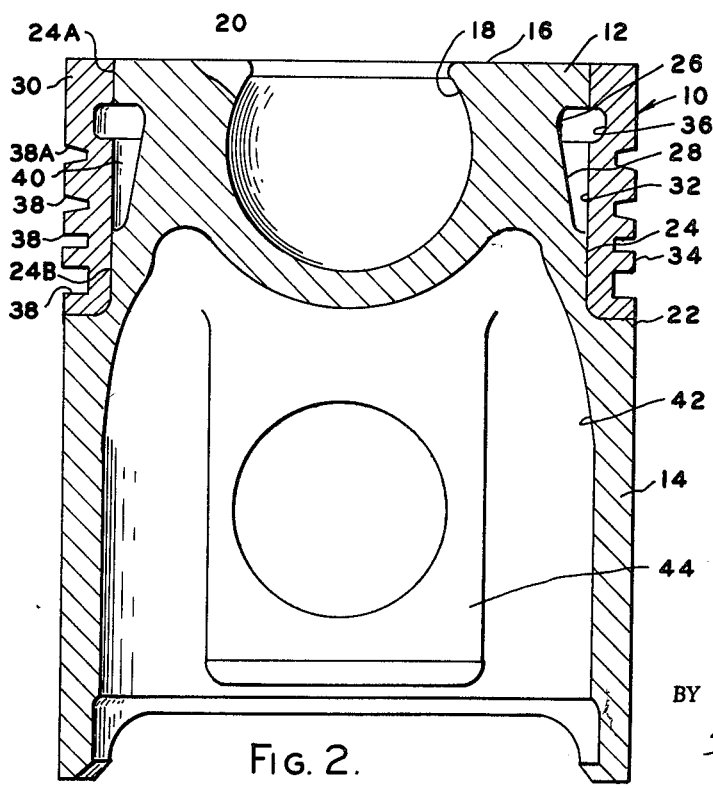
FIG. 2 is a cross sectional view taken substantially on line 2—2 of FIG. 1.

Now referring to the drawings for a more detailed description of the present invention a preferred piston 10 is illustrated in FIGS. 1–3 as comprising a head portion 12 and a skirt 14. The head portion 12 is provided with a face 16. A substantially spherical combustion chamber cavity 18 is provided in the face 16 and extends well into the head portion 12. A groove 20 is formed in the face 16 as can best be seen in FIG. 1 to direct fuel from an injection nozzle (not shown) into the combustion chamber cavity 18. The exterior surface 22 of the head portion 12 is reduced in section as shown to provide a substantially annular surface 24. An annular recess 26 and an axially extending elongated annular recess 28 are provided in the surface 24. The recesses 26 and 28 are positioned to register as shown.

A substantially cylindrical collar member 30 is provided with an annular axially extending interior surface 32 and an annular axially extending exterior surface 34. The collar member 30 is constructed to tightly fit over the reduced section of the head portion 12 as can best be seen in FIGS. 2–3 with the interior surface 32 tightly engaging the annular lands 24A–24B of the head portion 12. An annular recess 36 is provided in the interior surface 32 of the collar member 30 in a position to register with the recess 26 provided in the surface 24. The collar member 30 is preferably secured to the head portion 12 by electron beam welding between the land 24A and the interior surface 32. For this reason it is to be noted that prior to welding a surface-to-surface contact is provided between the land 24A and the interior surface 32 of the collar member 30. This particular method of construction substantially reduces manufacturing costs since very little machining at the juncture of the face 16 and the collar member 30 is necessary after the parts have been welded together and yet a secure connection is produced.

The exterior surface 34 of the collar member 30 is provided with a plurality of axially spaced ring grooves 38 and a top ring groove 38A. Each of the grooves 38 and 38A are adapted to carry a piston ring (not shown). The recesses 26, 28 and 36 form a closed cavity 40 positioned intermediate the combustion chamber cavity 18 and the area of the ring grooves 38–38A. The cavity 40 extends axially below the plane of the top ring groove 38A.

The skirt 14 of the piston 10 is preferably hollow as can best be seen in FIG. 2 to provide a substantially annular recess 42. Wrist pin bosses 44 extend radially inwardly into the recess 42 from opposite sides of the skirt 14. The bosses 44 are provided with axially aligned openings 46 which are adapted to carry a wrist pin (not shown).

As can best be seen in FIG. 3, a conical inlet 48 is provided in the head portion 12 with the wider portion thereof open to the recess 42. The opposite end of the inlet 48 communicates with a passage 50 provided in the head portion 12 and registering with the cavity 40 in the area of the recess 26. An outlet 52 provided in the head portion 12 and positioned oppositely from the inlet 48 provides communication between the recess 42 and the cavity 40 in the area of the recess 28. A nozzle 54 is connected with the oil pump 56 of the engine and is positioned to direct a stream of oil through the inlet 48 and into the cavity 40.

Another preferred embodiment of the present invention is illustrated in FIGS. 4–5 as comprising a piston 110 having a head portion 112 and a skirt 114. The head portion 112 is provided with a face 116, a combustion chamber cavity 118 and a groove 120 similar to those described above with reference to FIGS. 1–3. The head portion 112 is provided with a substantially annular axially extending exterior surface 122. A plurality of axially spaced ring grooves 124 and a top ring groove 124A are provided in the exterior surface 122.

A portion of the head 112 is removed at the juncture of the surface 122 and face 116 as shown to provide a radially extending surface 126 and an axially extending surface 128. The surfaces 126 and 128 are substantially normal with respect to each other in section as shown. An annular recess 130 is provided in the surface 128 and an elongated axially extending annular recess 132 is provided in the surface 126. The recesses 130–132 preferably are in registry as shown.

A substantially annular collar member 134 is provided with a radially extending surface 136 and an axially extending surface 138 respectively engaging the surfaces 126 and 128 of the head portion 112. The collar 134 is preferably provided with a corner recess 140 positioned to register with the recesses 130 and 132.

The surface 138 of the collar member 134 is formed to provide a surface to surface contact between the surface 138 and the surface 128 and the collar member 134 is secured to the head portion 112 by electron beam welding between these surfaces. Again, such a method of securing the collar member 134 to the head portion 112 substantially reduces the finish machining necessary during the manufacture of the piston.

The recesses 130, 132 and 140 form a closed cavity 142 positioned intermediate the combustion chamber 118 and the area of the ring grooves 124–124A and extending at least below the plane of the top ring groove 124A as shown.

The skirt 114 of the piston 110 is preferably hollow as shown to provide a substantially annular recess 144. A conical inlet 146 is provided in the head portion 112 to provide communication between the recess 144 and a passage 148 which registers with the upper portion of the cavity 142. An outlet 149 provided in the head portion 112 in a position substantially opposite the inlet 146 provides communication between the recess 144 and the lower portion of the cavity 142. A nozzle 150 connected with the oil pump 152 of the engine is positioned to direct a stream of oil through the inlet 146 and into the cavity 142.

In each of the embodiments described above, oil is delivered from the engine's oil pump and by the nozzles through the inlet and into the cavity provided between the combustion chamber and the area of the ring grooves. The conical shape of the inlet insures that most of the oil will be delivered to the cavity at any position of the piston. The inlet opens high in the cavity and the outlet registers with the lowest portion of the cavity. This arrangement insures that a substantial portion of the oil will be circulated through the cavity before discharging through the outlet to the crankcase of the engine. The reciprocal movement of the piston during operation of the engine contributes to the circulation of the oil through the cavity.

The cooling produced by the circulation of oil through the cavity substantially reduces operating temperatures in the area of the piston ring grooves and especially around the top ring groove. This reduction in temperature reduces ring groove deposits which are produced when temperatures in this area exceed the coking temperature of the fuel being used.

The particular constructions disclosed in the present application provide considerable improvement over the disclosure of the aforementioned copending application. By providing a surface-to-surface contact between the collar members and the head portions of the pistons and utilizing electron beam welding techniques to secure these surfaces together, a substantial reduction in manufacturing costs is produced.

It is apparent that although we have described several embodiments of our invention, many other changes and modifications can be made without departing from the spirit of the invention as expressed by the appended claims.

We claim:
1. In an internal combustion engine a piston assembly comprising,
 (a) a piston member having a head portion,
 (b) said head portion being provided with a top planar surface and a first annular exterior surface extending on an axis substantially normal with respect to said top surface,
 (c) said first annular surface being provided with a plurality of axially spaced piston ring grooves,
 (d) an annular recess being provided in said head portion at the juncture of said top planar surface and said first annular surface to form a second annular surface spaced radially inwardly from said first annular surface and concentric therewith and intersecting said top planar surface and an annular radially extending surface disposed intermediate said piston ring grooves and said top planar surface and intersecting said first and second annular surfaces,
 (e) a combustion chamber cavity extending into said head portion from said top planar surface,
 (f) an annular cavity registering with said recess at the juncture of said radially extending surface and said second annular surface,
 (g) a collar member being provided with an annular radially extending surface engaging said radially extending surface of said head portion and an annular axially extending surface engaging said second annular surface of said head portion.
 (h) said engaging surfaces of said head portion and said collar member being secured one to the other by electron beam welding and said collar member closing said annular cavity in said secured position, and
 (i) means circulating a coolant through said annular cavity.

2. The assembly as defined in claim 1 and in which said circulating means comprises
 (a) an inlet provided in said head portion and registering with the upper portion of said annular cavity,
 (b) an outlet spaced from said inlet and registering with the lower portion of said annular cavity, and
 (c) means directing a stream of oil through said inlet into said annular cavity.

3. The assembly as defined in claim 2 and in which said last mentioned means comprises
 (a) a source of oil under pressure and
 (b) a nozzle axially aligned with said inlet and connected with said oil under pressure.

4. The assembly as defined in claim 1 and in which said circulating means comprises
 (a) a conical inlet provided in said head portion and registering with said annular cavity,
 (b) an outlet provided in said head portion substantially radially opposite said inlet and registering with said annular cavity, and (c) a nozzle adapted for connection to the oil supply means of said engine and positioned to direct a stream of oil through said inlet and into said annular cavity.

References Cited by the Examiner

UNITED STATES PATENTS

| | | | |
|---|---|---|---|
| 2,159,989 | 5/39 | Hazen | 123—41.35 |
| 2,369,906 | 2/45 | Moore | 123—41.38 |

FOREIGN PATENTS

| | | |
|---|---|---|
| 1,230,754 | 4/60 | France. |
| 1,246,794 | 10/60 | France. |
| 802,480 | 10/58 | Great Britain. |

RICHARD B. WILKINSON, *Primary Examiner.*

KARL J. ALBRECHT, *Examiner.*